United States Patent
Hoffner et al.

(10) Patent No.: US 12,452,376 B2
(45) Date of Patent: Oct. 21, 2025

(54) SYSTEMS AND METHODS FOR GENERATING NETWORK POLICY DECISIONS FOR DATA SESSIONS

(71) Applicant: Verizon Patent and Licensing Inc., Basking Ridge, NJ (US)

(72) Inventors: Barry F. Hoffner, Bridgewater, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 402 days.

(21) Appl. No.: 18/061,719

(22) Filed: Dec. 5, 2022

(65) Prior Publication Data

US 2024/0187532 A1    Jun. 6, 2024

(51) Int. Cl.
*H04M 15/00* (2024.01)

(52) U.S. Cl.
CPC .................... *H04M 15/66* (2013.01)

(58) Field of Classification Search
CPC .............. H04M 15/66; H04M 15/8033; H04L 12/1407; H04W 4/24
See application file for complete search history.

(56) References Cited

U.S. PATENT DOCUMENTS

| | | | |
|---|---|---|---|
| 10,165,476 B1 * | 12/2018 | Yan | H04W 36/08 |
| 11,102,696 B1 * | 8/2021 | Chockalingam | H04M 15/66 |
| 2019/0174449 A1 * | 6/2019 | Shan | H04W 60/04 |
| 2021/0282038 A1 * | 9/2021 | Li | G06Q 20/382 |
| 2022/0014898 A1 * | 1/2022 | Cakulev | H04M 15/8214 |
| 2022/0312297 A1 * | 9/2022 | Cakulev | H04M 15/62 |
| 2023/0328821 A1 * | 10/2023 | Talebi Fard | H04W 76/15 370/329 |
| 2024/0235866 A1 * | 7/2024 | Talebi Fard | H04W 4/02 |
| 2024/0292203 A1 * | 8/2024 | He | H04M 15/8033 |

* cited by examiner

*Primary Examiner* — Abdullahi Ahmed

(57) ABSTRACT

A method may include receiving, by a policy control function (PCF), a first message including presence reporting area (PRA) information and status information identifying a type of network coverage associated with the PRA information. The method may also include determining, by the PCF, a policy for a user equipment (UE) device data session based on the received first message, and forwarding, by the PCF and prior to establishing the UE device data session, a second message identifying the determined policy to at least one of a session management function (SMF) or an access and mobility management function (AMF). The method may further include applying the determined policy to the UE device data session.

20 Claims, 6 Drawing Sheets

SYSTEMS AND METHODS FOR GENERATING NETWORK POLICY DECISIONS FOR DATA SESSIONS

BACKGROUND INFORMATION

Presence Reporting Area (PRA) information is often used to determine session management policies associated with servicing user device data sessions. For example, based on PRA information, a core network may be able to enforce various quality related parameters for a user's data session. However, assumptions regarding the particular PRA information are often made by network functions in a core network when a data session is initially established. In situations where the assumptions regarding the PRA information are incorrect, additional signaling is typically needed to correct the incorrect assumptions with respect to managing a data session. This additional signaling often adds to network congestion or possibly causes a delay in setting up a data session.

DETAILED DESCRIPTION OF EXAMPLE EMBODIMENTS

The following detailed description refers to the accompanying drawings. The same reference numbers in different drawings may identify the same or similar elements.

Implementations described herein provide information to a network function associated with generating policy decisions for a data session prior to establishing the data session. In an exemplary implementation, a policy control function (PCF) may receive presence reporting area (PRA) information identifying a location or area in which a user device is located, along with a particular type of network coverage available in the PRA. The PCF may then make an initial policy decision regarding the type of data session that will be established, such as a Fifth Generation (5G) millimeter (mm) Wave data session, a 5G C-band data session, a Fourth Generation Long Term Evolution (4G LTE) data session, etc. In other implementations, tracking area identity/identifier (TAI) information may be provided to the PCF to allow the PCF to generate a policy decision based on the TAI and network coverage available in the particular TAI. In each case, one or more network elements in a core network may provide a message to the PCF or other network functions generating the policy decision to allow the data session to be established in accordance with the appropriate network coverage available to the user device. In this manner, core elements of the network provide a reliable and efficient mechanism for establishing data sessions in accordance with particular types of network coverage available to a user device.

Figure 1:
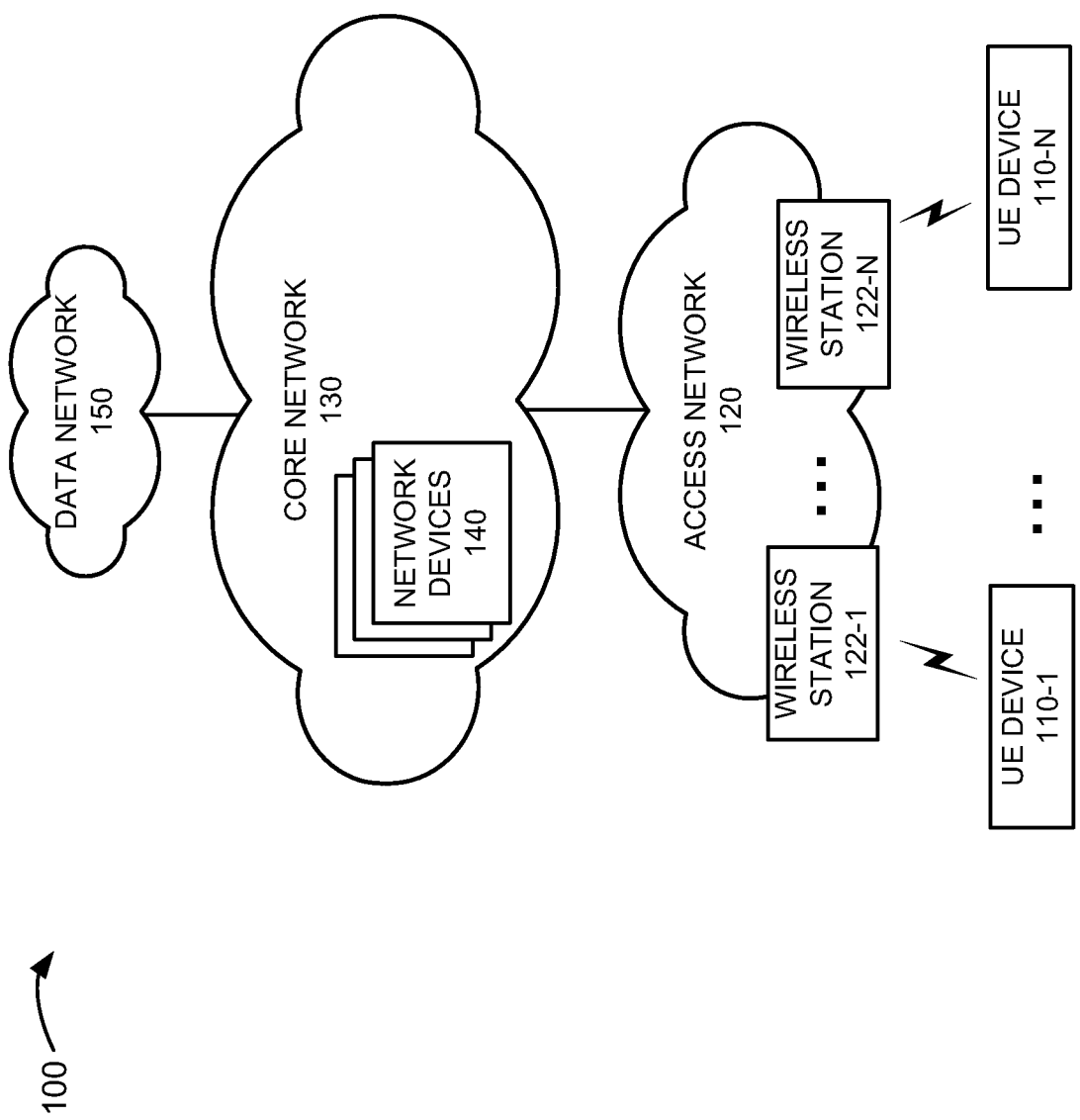
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) devices 110-1 through 110-N, access network 120, wireless stations 122-1 through 122-N, core network 130, network devices 140 and data network 150.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, an Internet of Things (IOT) device, a machine type communication (MTC) device, etc., that includes communication functionality. UE device 110-1 may connect to access network 120 via wireless station 122-1 and UE device 110-N may connect to access network 120 via wireless station 122-N. UE devices 110 may also connect to other devices in environment 100 via other techniques, such as wired, wireless, optical connections or a combination of these techniques. UE device 110 and a person that may be associated with UE device 110 (e.g., the party holding or using UE device 110) may be referred to collectively as UE device 110 or UE 110 in the description below.

Access network 120 may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. For example, access network 120 may include the functionality of a 5G network, such as 5G Radio Access Network (RAN) communicating via mmWave technology, a 5G RAN communicating via C-band technology or other types of 5G networks. Access network 120 may also include a 4G RAN.

Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as category Cat-M1), Low Power Wide Area (LPWA) technology such as Narrow Band (NB) IoT (NB-IOT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the particular device is within radio frequency range of wireless station 122. In one implementation, wireless station 122 may include 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNodeB)) or a 6G base station that communicates wirelessly with UEs 110 located within the radio frequency range of wireless station 122.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components (e.g., a User Plane Function (UPF), an Access and Mobility Management Function (AMF), a Session Management Function (SMF), a Unified Data Management (UDM) function, a Unified Data Repository (UDR), a Policy Control Function (PCF), an access management-policy control function (AM-PCF), a session management-policy control function (SM-PCF), a Charging Function (CHF), a network exposure function (NEF), an application function (AF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementation, network devices 140 may include combined 4G and 5G functionality, such as a session management function with PGW-control plane (SMF+PGW-C) and a user plane function with PGW-user plane (UPF+PGW-U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple access networks 120, core networks 130 and data networks 150. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
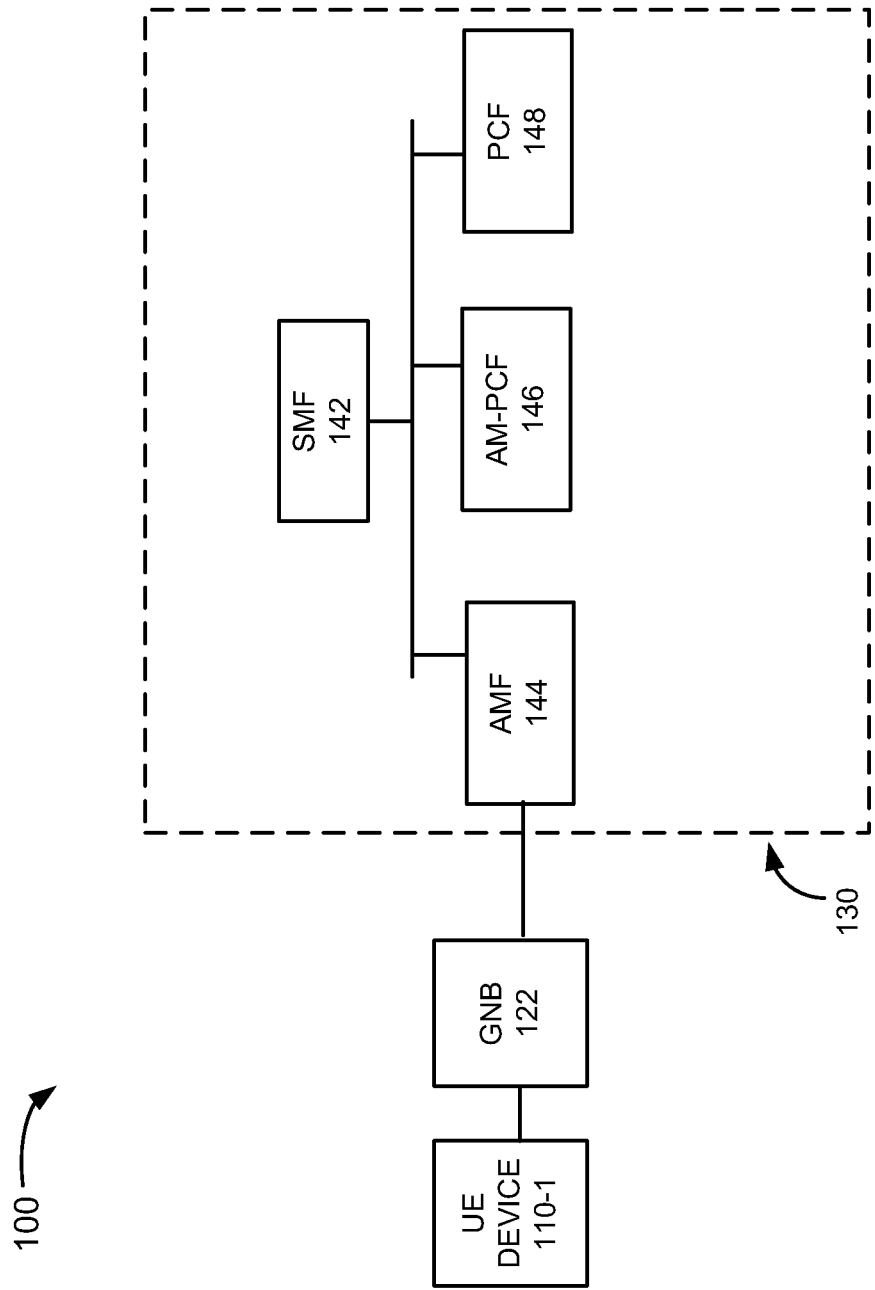
FIG. 2 is a block diagram of components implemented in the environment of FIG. 1 in accordance with an exemplary implementation.

FIG. 2 illustrates a portion of environment 100, including elements implemented in core network 130 in accordance with an exemplary implementation. Referring to FIG. 2, network devices 140 in core network 130 include session management function (SMF) 142, access and mobility management function (AMF) 144, access management-policy control function (AM-PCF 146) and policy control function (PCF) 148. It should be understood that core network 130 may include other elements/functions, such as a UPF, UDM, UDR, NEF, etc., and/or differently arranged elements. Environment 100 also includes UE device 110-1 and wireless station 122 (depicted as gNB 122).

As illustrated in FIG. 2, UE device 110-1 may connect to core network 130 via wireless station 122, shown in FIG. 2 as gNB 122. SMF 142 may perform session establishment, session modification, and/or session release, perform Internet Protocol (IP) address allocation and management, perform Dynamic Host Configuration Protocol (DHCP) functions, perform selection and control of a UPF (not shown), configure traffic steering at the UPF to guide the traffic to the correct destinations, terminate interfaces toward a PCF (not shown), perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data.

AMF 144 may perform registration management, connection management, reachability management, mobility management, lawful intercepts, Short Message Service (SMS) transport between UE device 110 and other network functions, session management messages transport between UE device 110 and SMF 142, access authentication and authorization, location services management, functionality to support non-3GPP access networks, and/or other types of management processes.

AM-PCF 146 may perform access management functions, as well as some policy control functions. For example, AM-PCF 146 may identify PRA information in environment 100 and provide this information to AMF 144, which may then forward the PRA information to SMF 142, as described in more detail below.

PCF 148, also referred to as session management-policy control function (SM-PCF) 148 may perform policy control functions, as well some session management function. For example, PCF 148 may support policies to control network behavior, provide policy rules to control plane functions (e.g., to SMF 142), access subscription information relevant to policy decisions, generate policy decisions, and/or perform other types of processes associated with policy enforcement. Furthermore, PCF 148 may obtain an enterprise policy that includes a mapping between applications associated with the enterprise and quality of service (QOS) classes and may provide the enterprise policy to SMF 142 and/other elements in core network 130. In an exemplary implementation, PCF 148 may generate a policy decision regarding a UE data session based on location-related information associated with UE 110, such as PRA information, prior to a UE data session being established, as described in detail below.

Environment 100 illustrated in FIG. 2 may include additional elements and/or NFs that are not illustrated. Such elements and/or NFs may provide security, authentication and authorization, network polices, subscriber profiles, network slicing, and/or facilitate the operation of core network 130. It should also be understood that functions described as being performed by various elements in FIG. 2, including elements in core network 130, may be performed by other elements/functions in other implementations.

Figure 3:
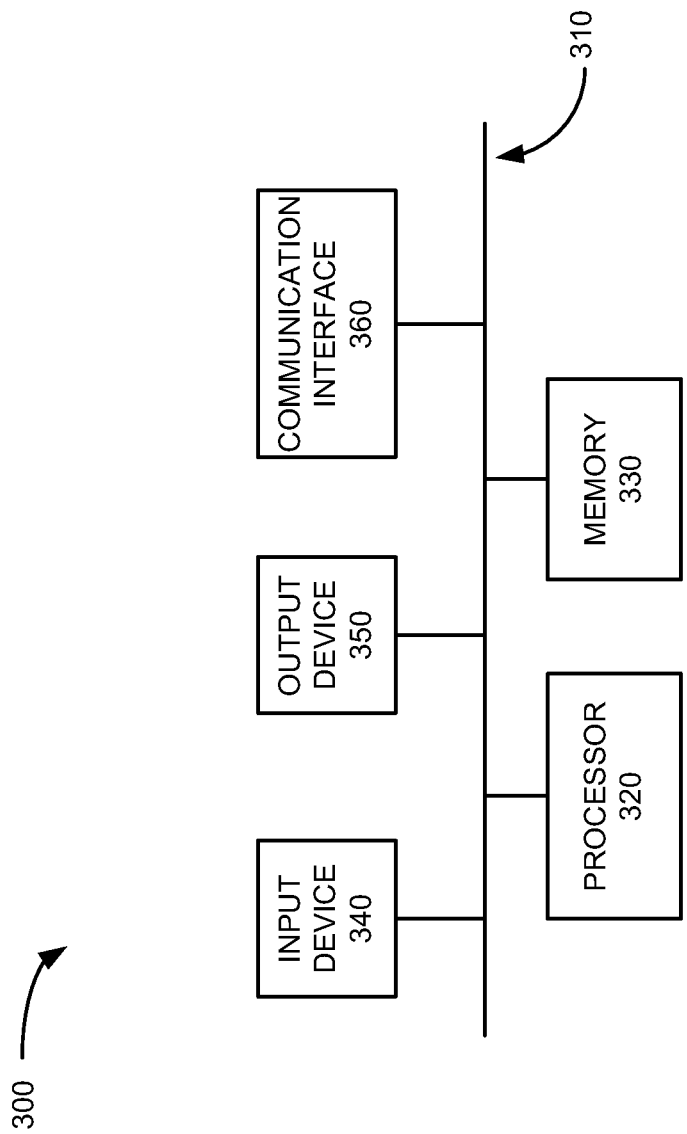
FIG. 3 illustrates logic components implemented in one or more of the devices illustrated in FIGS. 1 and 2 in accordance with an exemplary implementation.

FIG. 3 illustrates an exemplary configuration of a device 300. One or more devices 300 may correspond to or be included in devices in environment 100, such as UE device 110, wireless station 122, network devices 140, such as SMF 142, AMF 144, AM-PCF 146, PCF 148 and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display may act as both an input device 240 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
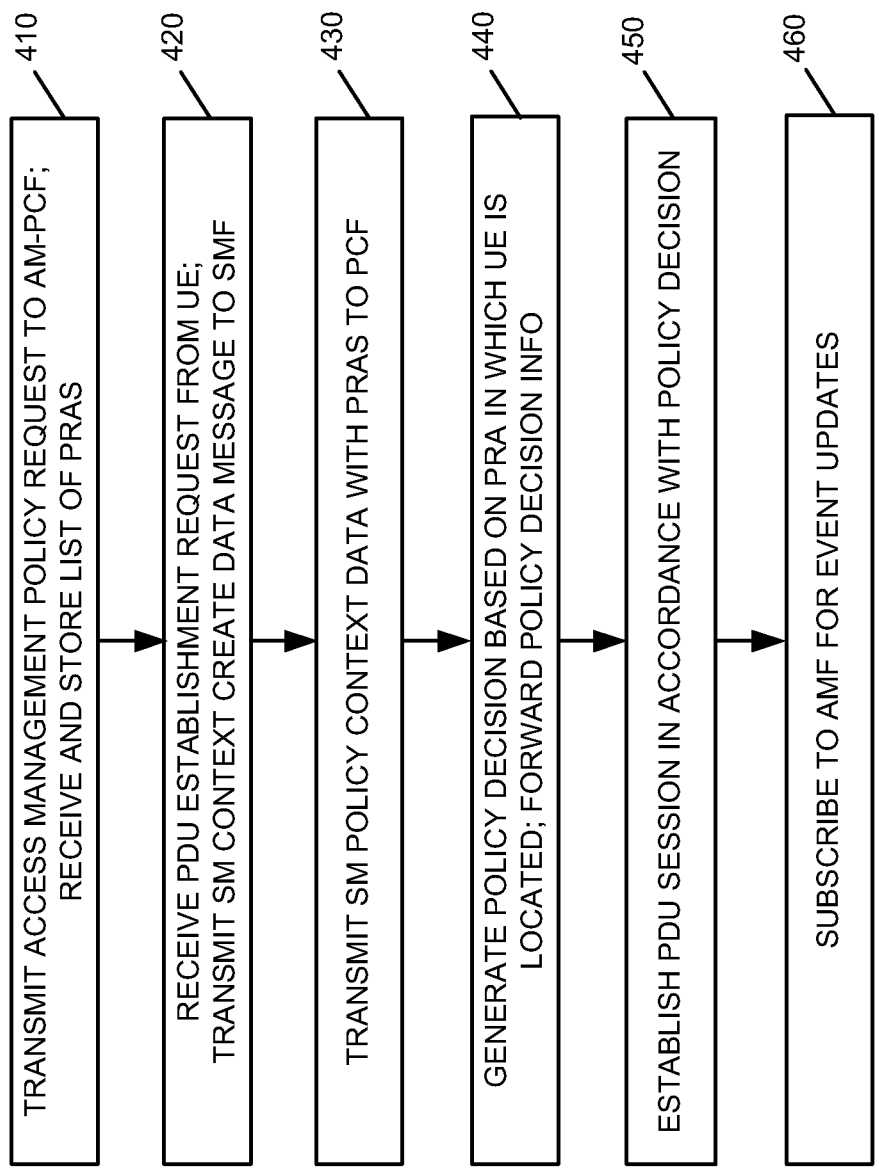
FIG. 4 is a flow diagram illustrating processing associated with generating a policy decision regarding a data session in accordance with an exemplary implementation.
Figure 5A:
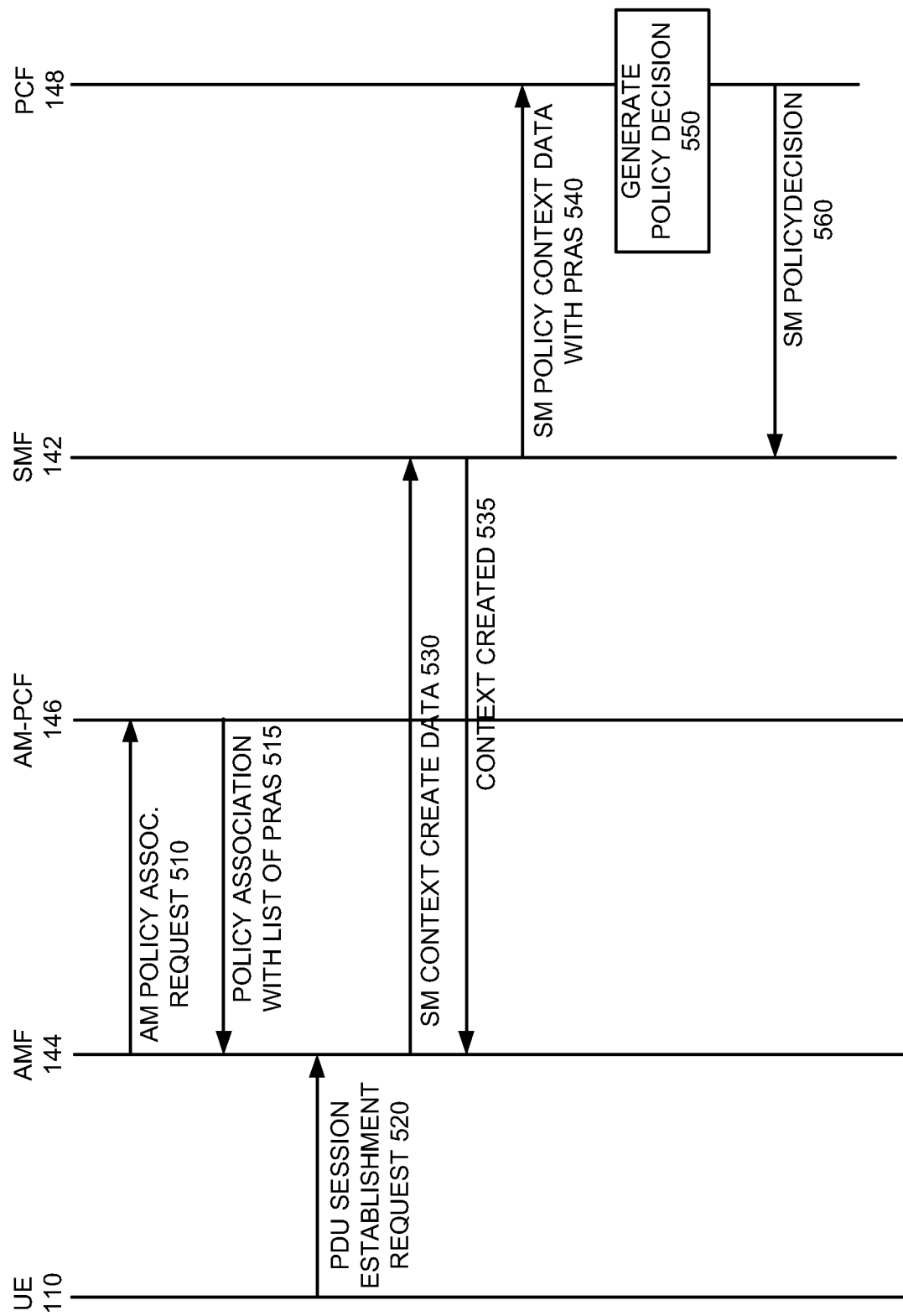
FIGS. 5A and 5B are exemplary signal flow diagrams associated with the processing of FIG. 4.
Figure 5B:
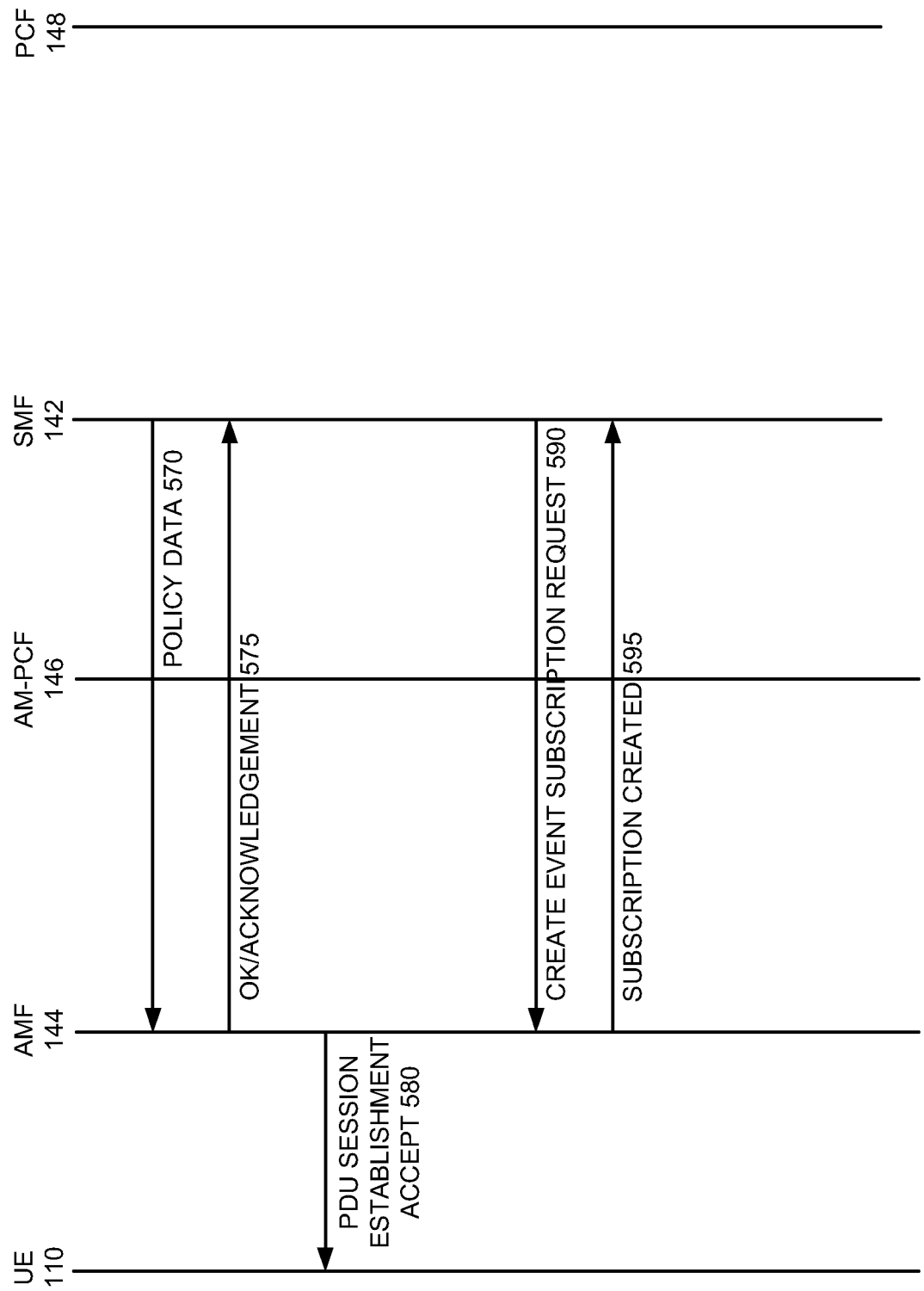

FIG. 4 is a flow diagram illustrating processing associated with generating policy control decisions with respect to network sessions in accordance with an exemplary implementation. FIGS. 5A and 5B are signal flow diagrams illustrating exemplary signal flows associated with the processing of FIG. 4. Processing may begin with AM-PCF 146 obtaining and storing a list of PRA identifiers (IDs) prior to the establishment of PDU sessions in environment 100. For example, AM-PCF 146 may be preconfigured to store PRA information, such a PRA IDs, and corresponding network coverages available in each PRA. As described previously, a PRA may correspond to a physical area or location in environment 100. AM-PCF 146 may store a list of PRA IDs used in environment 100, along with information identifying network coverages available in each PRA. The PRA information and network coverage statuses may be updated as additional coverages become available in environment 100, such as when various areas/locations are provided with 5G coverage, such as mmWave coverage, C-band coverage, etc.

In an exemplary implementation, after AM-PCF 146 has been configured to store PRA information, AMF 144 may transmit an access management (AM) policy association request to AMF-PCF 146 (FIG. 4, block 410; FIG. 5A, 510). AM-PCF 146 receives the AM policy association request and generates a policy association response that includes a list of PRA IDs used in environment 100 along with a type of network coverage associated with each PRA ID. The type of network coverage may indicate whether a particular PRA is associated with or located in an area where 5G service is available, a type of 5G service that is available (e.g., mmWave, C-band, etc.) or is associated with or located in an area where only 4G service is available. In one implementation, AM-PCF 146 may access a user or subscriber database, such as a UDR, to identify the listing of PRAs.

AM-PCF 146 forwards the policy association with the list of PRA IDs to AMF 144 (FIG. 5A, 515). AMF 144 receives the policy association and stores the list of PRA IDs (block 410). AMF 144 may also determine the status of each PRA in environment 100, such as the corresponding network coverage for each PRA ID. AMF 144 may also begin monitoring the status of the PRA IDs provided in the PRA list. For example, AMF 144 may monitor the PRA IDs with respect to whether 5G coverage, such as mmWave coverage, C-band coverage, etc., has changed with respect to the PRAs, become available with respect to the PRAs, etc. Determining the status of the PRA IDs and monitoring the status of the PRA IDs may include AMF 144 interacting with other elements in core network 130 and/or access network 120 to determine and/or obtain the status.

After AMF 144 has received and stored the list of PRA IDs and corresponding network coverages for the PRA IDs, assume that UE 110 wishes to establish a protocol data unit (PDU) session in environment 100. For example, assume that UE 110 transmits a PDU session establishment request to AMF 144 (FIG. 5A, 520). AMF 144 receives the PDU session establishment request and transmits a session management (SM) context create data request message with the list of PRAs and corresponding network coverages/statuses to SMF 142 (block 420; FIG. 5A, 530).

For example, the SM context create data request message may include the PRA IDs and their corresponding network coverage statuses, such as {PRA ID X=mmWave, status=IN} {PRA ID X=C-band; status=OUT} to SMF 142. This may indicate that PRA ID X (wherein X may be any value associated with a PRA in environment 100 and may correspond to the PRA ID associated with the location of UE 110) is associated with mmWave coverage and is not associated with C-band coverage. Other PRA IDs along with the corresponding network coverage statuses may indicate that C-band coverage is available (e.g., C-band status=IN), only 4G LTE coverage is available (4G LTE status=IN), etc.

SMF 142 receives the context data with the list of PRAs and corresponding network coverage statuses and sends an acknowledgement indicating that the SM context data has been received/created (FIG. 5A, 535). SMF 142 may also transmit the PRA information, including the network coverage status information, to PCF 148 for use in generating an appropriate SM policy (block 430; FIG. 5A, 540). For example, PCF 148 may receive the SM policy context data and generate a session management policy for the PDU session for UE 110 based on the PRA in which UE 110 is located (block 440; FIG. 5A, block 550).

For example, continuing with the example above in which {PRA ID X=mmWave, status=IN} and {PRA ID X=C-band; status=OUT}, PCF 148 may determine the policy based on the actual PRA in which UE 110 is located. For example, based on information included in the PDU establishment request message (i.e., FIG. 5A, message 520), AMF 144 may identify the particular PRA ID associated with UE 110. For example, based on a source IP address included in the PDU establishment request message, a wireless station 122 (e.g., an eNB or gNB) via which the PDU establishment request message is received, or other information associated with transmissions from UE 110 to access network 120 and/or core network 130, AMF 144 may identify the particular PRA ID associated with UE 110. Continuing with the example above, if the PRA ID is equal to X, based on the location of UE 110, PCF 148 generates a policy decision based on the UE 110 being a 5G device located in a PRA where mmWave 5G coverage is available (e.g., mmWave status=IN, C-band status=OUT).

PCF 148 may then send the generated policy decision information to SMF 142 (FIG. 5A, 560). SMF 142 may then forward the policy decision information to AMF 144 (block 440; FIG. 5B, 570) and AMF 142 sends an acknowledgement to SMF 142 (FIG. 5B, 575). The policy decision information may indicate that the PDU session is to be established in accordance with protocols and/or requirements associated with a 5G mmWave data session. AMF 144 may also send a PDU session establishment accept message to UE 110 and establish the PDU session in accordance with the generated policy decision (block 450; FIG. 5B, 580).

The data session for UE 110 may then proceed in accordance with the policy generated by PCF 148. For example, the data session may be managed by elements in core network 130 to provide and enforce various quality of service (QOS) or service level agreement (SLA) parameters, such as enforce a particular QoS class identifier (QCI) for the data session, enforce an allocation and retention priority (ARP) associated with the data session or enforce other quality related parameters corresponding to a 5G mmWave data session.

SMF 142 may also subscribe to event information associated with AMF 144 (block 460). For example, SMF 142 may transmit a create event subscription request to AMF 144 (FIG. 5B, 590). This subscription request is transmitted so that SMF 142 will be provided with any updates or changes with respect to PRA IDs and their corresponding network coverages in environment 100. AMF 144 receives the subscription request, creates the subscription for SMF 142 and transmits an acknowledgment/subscription created message to SMF 142 (FIG. 5B, 595). SMF 142 may then receive any updates from AMF 144 regarding PRAs and/or changes in network coverages in environment 100. This information may then be used to change a network policy with respect to user data sessions.

As described above, information regarding PRAs may be provided to a network function (e.g., PCF 148) generating a policy for a data session. In other implementations, tracking area identity/identifier (TAIs) information may be provided to PCF 148 in a similar manner. For example, AMF 144 may store a list of TAIs and corresponding network coverages. In this implementation, AMF 144 may provide the TAIs and corresponding network coverages to SMF 142, which forwards the TAIs to PCF 148. PCF 148 may then generate the appropriate policy based on the particular TAI in which UE 110 is located.

Implementations described herein provide for generating a policy decision regarding a UE data session based on PRA or TAI information that is provided to a PCF device prior to the establishment of a data session. Generating a policy decision based on the PRA/TAI information for a UE device 110 may allow a data session to be setup in an efficient manner in accordance with the type of network coverage available to the UE device 110. In addition, having such information prior to the establishment of a UE device data session may allow a network service provider to avoid extra signaling after a data session has been established and/or changing a policy decision after the data session has been established.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with PCF 148 generating a policy decision based on information provided by SMF 142 and/or AMF 144. In other implementations, other network functions/elements may interface with PCF 148 to provide the PRA or TAI information.

In addition, features have been described with respect to generating network policy decisions using elements in core network 130. In other implementations, similar processing may be performed in other portions of environment 100, such as in a Multi-access Edge Computing (MEC) platform located, for example, between access network 120 and core network 130. In still other implementations, a number of PCFs 148 may be distributed in environment 100 to generate network policy decisions, as described above.

Further, while series of acts have been described with respect to FIG. 4 and signal flows with respect to FIGS. 5A and 5B, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, by a policy control function (PCF), a first message including presence reporting area (PRA) information and status information identifying a type of network coverage associated with the PRA information, wherein the first message is received prior to establishment of a user equipment (UE) device data session;
determining, by the PCF, a policy for the UE device data session based on the received first message;
forwarding, by the PCF and prior to establishing the UE device data session, a second message identifying the determined policy to at least one of a session management function (SMF) or an access and mobility management function (AMF); and
applying the determined policy to the UE device data session.

2. The method of claim 1, wherein the determining further comprises:
identifying a PRA identifier (ID) associated with a location of the UE device, and
determining the policy based on the location of the UE device and information included in the first message.

3. The method of claim 1, further comprising:
subscribing, by the SMF, to event information associated with the AMF; and
receiving, by the SMF and from the AMF, updates to the PRA information.

4. The method of claim 3, further comprising:
generating, by the PCF, a new policy based on updates to the PRA information.

5. The method of claim 1, wherein the determining further comprises:
determining that the policy for the UE device data session is associated with a Fifth Generation (5G) data session.

6. The method of claim 5, wherein the determining further comprises determining that the 5G data session is associated with one of a millimeter (mm) Wave connection or a C-band connection.

7. The method of claim 1, further comprising:
enforcing the determined policy based on a least one of a quality of service class identifier (QCI) or allocation and retention priority (ARP) information associated with the determined policy.

8. The method of claim 1, further comprising:
receiving, by the PCF, a third message including tracking area identity (TAI) information and status information identifying a type of network coverage associated with the TAI information;
determining, by the PCF, a policy for a second UE device data session based on the received third message;
forwarding, by the PCF, a fourth message identifying the determined policy to at least one of the SMF or AMF; and
applying the determined policy to the second UE device data session.

9. A system, comprising:
at least one device configured to:
receive a first message including presence reporting area (PRA) information and status information identifying a type of network coverage associated with the PRA information, wherein the first message is received prior to establishment of a user equipment (UE) device data session;
determine a policy for the UE device data session based on the received first message;
forward, prior to establishing the UE device data session, a second message identifying the determined policy to at least one of a session management function (SMF) or an access and mobility management function (AMF); and
apply the determined policy to the UE device data session.

10. The system of claim 9, wherein the at least one device comprises a policy control function, the SMF and the AMF.

11. The system of claim 9, wherein when determining, the at least one device is configured to:
identify a PRA identifier (ID) associated with a location of the UE device, and
determine the policy based on the location of the UE device and information included in the first message.

12. The system of claim 9, wherein the at least one device is further configured to:

subscribe to event information associated with the AMF; and receive from the AMF, updates to the PRA information.

13. The system of claim 9, wherein when determining, the at least one device is further configured to:

determine that the policy for the UE device data session is associated with a Fifth Generation (5G) data session.

14. The system of claim 13, wherein the 5C data session is associated with one of a millimeter (mm) Wave connection or a C-band connection.

15. The system of claim 9, wherein the at least one device is further configured to:

enforce the determined policy based on a least one of a quality of service class identifier (QCI) or allocation and retention priority (ARP) information associated with the determined policy.

16. The system of claim 9, wherein the at least one device is further configured to:

receive a third message including tracking area identity (TAI) information and status information identifying a type of network coverage associated with the TAI information;

determine a policy for a second UE device data session based on the received third message;

forward a fourth message identifying the determined policy to at least one of the SMF or AMF; and apply the determined policy to the second UE device data session.

17. The system of claim 12, wherein the at least one device comprises the SMF, and wherein when subscribing to event information, the SMF is configured to subscribe to the event information.

18. A non-transitory computer-readable medium having stored thereon sequences of instructions which, when executed by at least one processor, cause the at least one processor to:

receive a first message including presence reporting area (PRA) information and status information identifying a type of network coverage associated with the PRA information, wherein the first message is received prior to establishment of a user equipment (UE) device data session;

determine a policy for the UE device data session based on the received first message; and forward, prior to establishing the UE device data session, a second message identifying the determined policy to at least one of a session management function (SMF) or an access and mobility management function (AMF).

19. The non-transitory computer-readable medium of claim 18, wherein the instructions further cause the at least one processor to:

identify a PRA identifier (ID) associated with a location of the UE device, and determine the policy based on the location of the UE device and information included in the first message.

20. The non-transitory computer-readable medium of claim 18, wherein the instructions further cause the at least one processor to:

receive a third message including tracking area identity (TAI) information and status information identifying a type of network coverage associated with the TAI information;

determine a policy for a second UE device data session based on the received third message; and forward a fourth message identifying the determined policy to at least one of the SMF or AMF.

\* \* \* \* \*